United States Patent [19]
Benedict et al.

[11] 3,859,807
[45] Jan. 14, 1975

[54] COLD TRAP SYSTEM FOR RECOVERING CONDENSABLE GAS FROM A VESSEL TO BE EVACUATED

[75] Inventors: Manson Benedict, Westfield; William I. Thompson, Elizabeth, both of N.J.; Robert L. Parrish, Winthrop Harbor, Ill.

[73] Assignee: The United States of America as represented by the United States Atomic Energy Commission, Washington, D.C.

[22] Filed: Aug. 26, 1947

[21] Appl. No.: 770,632

[52] U.S. Cl. ................................................ 62/55.5
[51] Int. Cl. .............................................. B01d 5/00
[58] Field of Search ..... 183/2, 2.55, 2.71, 5, 114 N, 183/115, 119; 62/121, 55.5

[56] References Cited
UNITED STATES PATENTS
1,307,999  6/1919  Buckley ................................. 62/1
1,831,644  11/1931  Adair et al. ............................. 62/121

*Primary Examiner*—Benj. R. Padgett
*Attorney, Agent, or Firm*—John A. Horan; Harmon S. Potter

EXEMPLARY CLAIM

1. A system for recovering a condensible gas by solidifying the same in a cold trap that comprises a vessel to be evacuated, a pump having an inlet and an outlet side and arranged to withdraw gas from said vessel, means connecting said vessel with the intake side of said pump, a refrigerated cold trap for solidifying said gas, said trap having an inlet and an outlet, means connecting the inlet of said cold trap with the outlet side of said pump, an absorbent trap connected with the outlet of said cold trap and arranged to absorb traces of the condensible gas passing through said cold trap, and means for admitting an inert and relatively incondensible gas into said vessel to purge the condensible gas therefrom.

5. A system for recovering uranium hexafluoride gas by solidifying the same in a cold trap that comprises a diffusion cell to be evacuated, a vacuum pump having an inlet and an outlet side and arranged to withdraw said gas from said cell, means connecting said cell with the inlet side of said pump, a refrigerated cold trap for solidifying said gas, said trap having an inlet and an outlet, heating means associated with said cold trap whereby the contents of said trap may be converted to a fluid state, means connecting the inlet of said cold trap with the outlet side of said pump, said means including a filter arranged to remove traces of pump oil from the gas being withdrawn from the cell, a fluorocarbon trap connected with the outlet of said cold trap and arranged to absorb traces of uranium hexafluoride gas passing through the cold trap, means for admitting dry nitrogen gas to said cell to purge the uranium hexafluoride gas therefrom, and means for returning the uranium hexafluoride gas to said cell from said cold trap.

5 Claims, 2 Drawing Figures

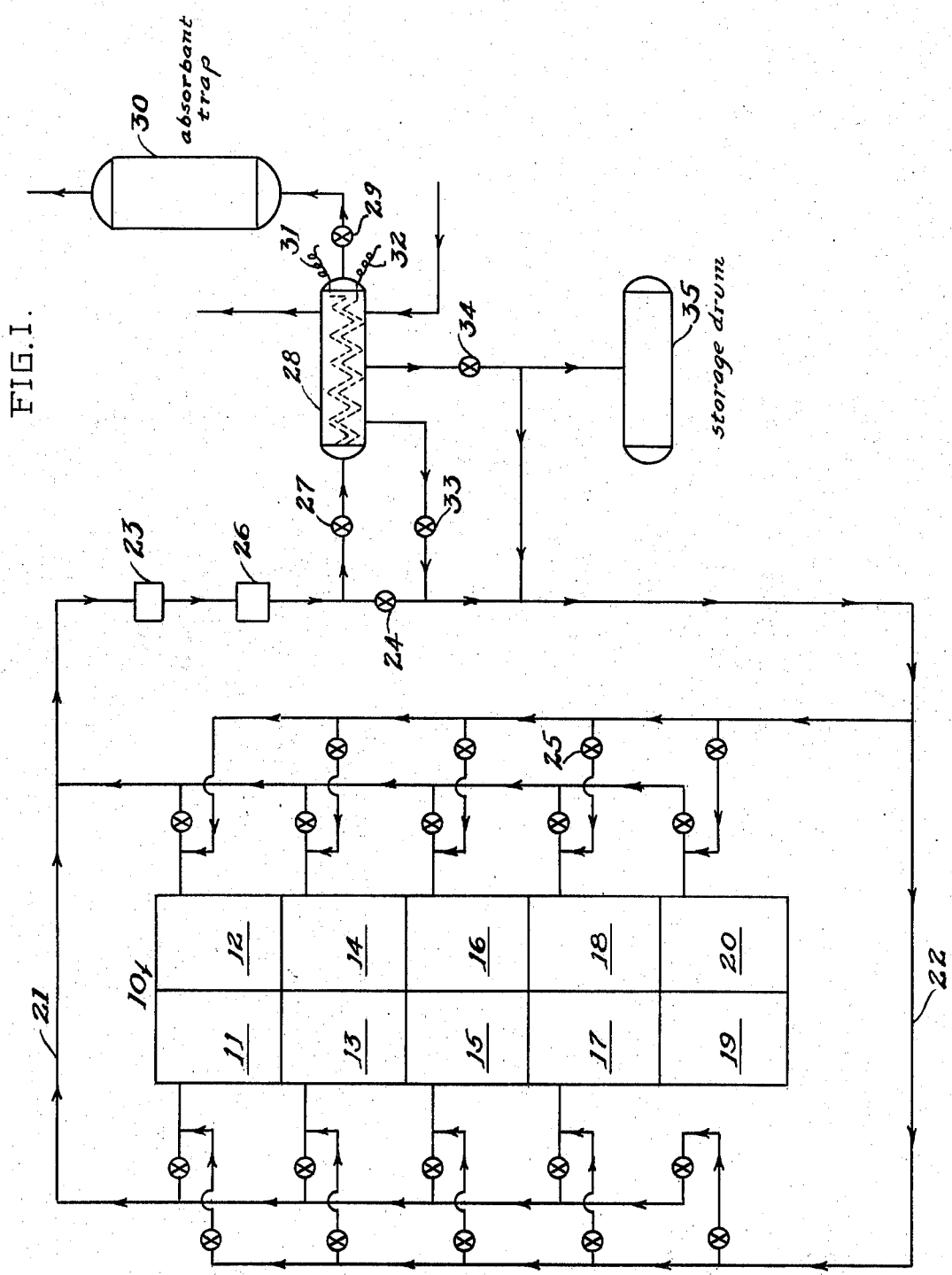

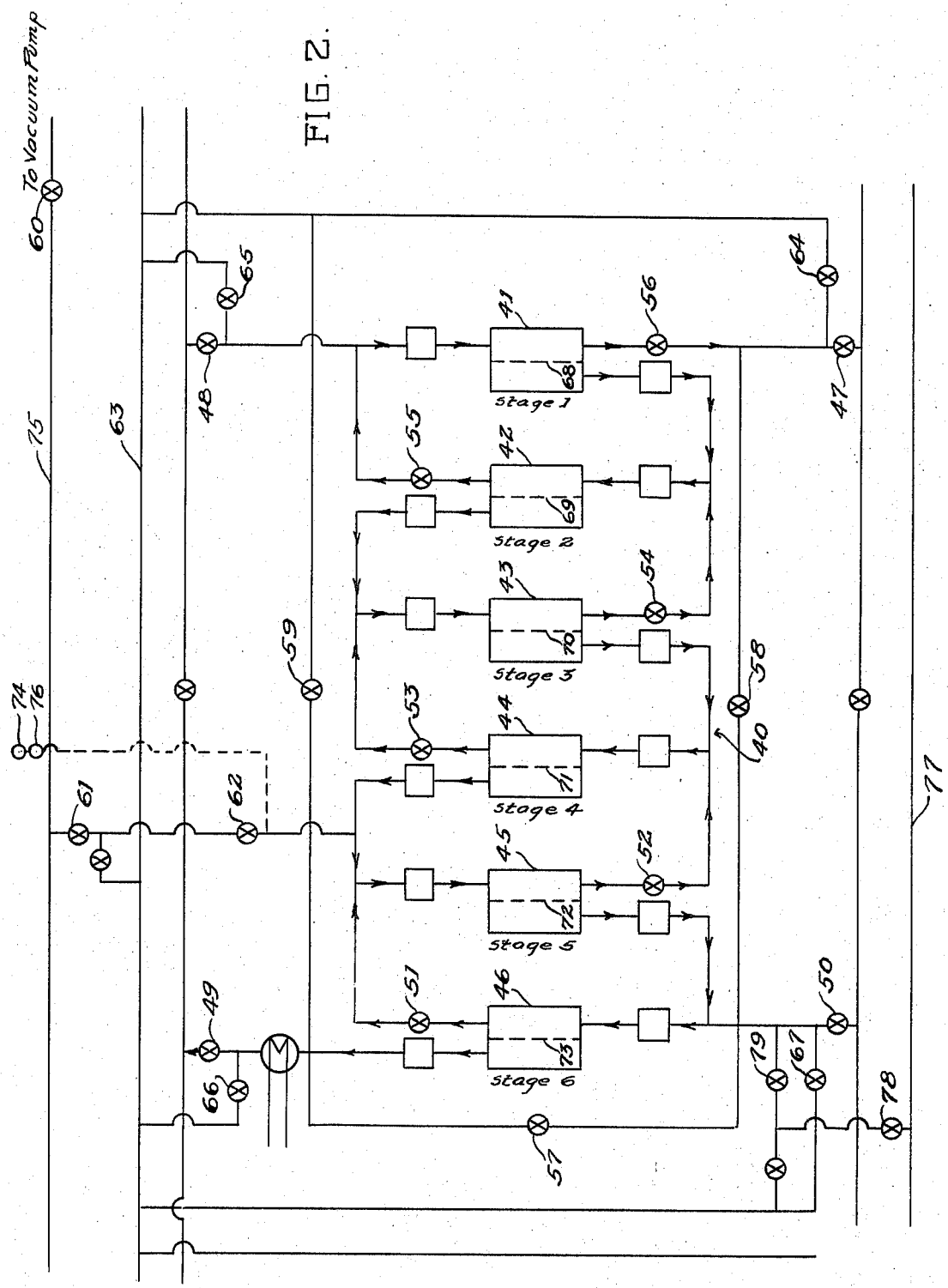

COLD TRAP SYSTEM FOR RECOVERING CONDENSABLE GAS FROM A VESSEL TO BE EVACUATED

The present invention relates to systems for the separation of isotopes of a gas by diffusion through a permeable membrane and in particular it relates to that portion of such systems relating to the recovery of the gas from a diffusion cell when it becomes necessary to shut down the cell for routine repairs or because of mechanical failure such as, for example, the breaking of a seal. The present invention is in general applicable to any system wherein a condensible gas is to be recovered from a vessel to be evacuated.

Systems for separating the isotopes of gaseous uranium hexafluoride like $U^{235}F_6$ from $U^{238}F_6$, employ a large plurality of cells through which the gas is pumped. This gas is initially quite valuable and becomes much more so as the concentration of the lighter isotope, $U^{235}F_6$ is increased in the later part of the separation process. Obviously, if for economic reasons alone, all the gas must be recovered when a cell is shut down. Moreover, a gas such as uranium hexafluoride is extremely corrosive and highly toxic. The maximum safe concentration of this gas in air has been determined to be 150 micrograms per cubic meter for chronic exposure. This is equivalent to a partial pressure of only $1 \times 10^{-8}$ atmospheres. For this additional reason, therefore, it is of great importance that a recovery system be developed that can be depended upon to remove substantially all of the process gas from equipment during temporary shut downs. The seriousness of this problem will be appreciated when one considers that in the operation of a large diffusion separation plant a number of cells will be shut down every day for repairs.

Several solutions to the problem of complete recovery of process gas from shut down equipment were considered. For example, the process gas might be removed from equipment and absorbed in a chemically inert material such as a fluorocarbon. However, from an operational standpoint it is deemed to be more convenient and workable to condense the process gas in a refrigerated cold trap. This method is superior in convenience since by heating the trap, the uranium hexafluoride is readily returned to the gaseous state and may be pumped back into the diffusion system.

In designing a recovery system employing a cold trap, means must be provided for evacuating and purging the cell that is to be shut down. Such a gas should be substantially non-reactive with uranium hexafluoride and should be incondensible at the temperatures used in the cold trap to solidify the uranium hexafluoride. Also, means must be provided for purging the cold trap to the system when it is desired to return the process gas to a diffusion cell. Furthermore, evacuation and purging cycles must be developed which will permit use of the smallest and most economical equipment and still give results meeting the necessarily high standards required of the process gas recovery system.

Heretofore, cold traps have been employed for condensation and storage of uranium hexafluorides. However, it has been the practice to place the cold trap intermediate the cell being evacuated and a vacuum pump. This arrangement is inefficient because the recovery equipment in such a situation operates at cell pressure which is below atmospheric pressure in practice. This low operating pressure has an objectionable effect on the entire cold trap system. For example, it has been found that a much lower temperature is necessary than when the recovery system is operated at atmospheric pressure. This difference amounts to approximately 35° F. and is a large item when operating on a production scale.

Also, when the recovery system is located ahead of the vacuum pump the piping and trap free spaces must be large to avoid pressure drop.

In addition, considerably more cooling area is required due to the lower heat transfer coefficients at lower pressures, and finally, larger cold trap weights are needed and greater refrigeration capacity is needed, especially when the traps are cooled.

It is an object of this invention to provide a new and improved system for removing and storing process gas with a minimum loss thereof.

It is a further object of this invention to provide a more economical and more efficient system for recovering process gas by condensing it in a refrigerated cold trap.

It is still a further object of this invention to provide a more economical and more efficient system for recovering a condensible gas from a vessel to be evacuated.

Other objects and advantages of this invention will appear from time to time in the detailed description thereof in this specification.

The foregoing objects are achieved and substantial economies are realized according to this invention by operating the recovery system at substantially atmospheric pressure. This may be done by locating the cold trap on the exhaust rather than on the intake side of the vacuum pump, the pump serving to raise the pressure of the gas before it enters the cold trap. Heretofore this arrangement has not been used because it was thought that drawing process gas through a vacuum pump would result in excessive loss of process gas by absorption in the pump oil. However, it has been found that with vacuum pumps of proper design such losses are not serious, and the advantage of locating the pump ahead of the cold trap has been proven to far outweigh the disadvantages thereof.

The invention may be more fully understood by reference to the accompanying drawings wherein:

FIG. 1 is a schematic flow diagram of a recovery system embodying the principles of the invention as applied to a plurality of cells, and FIG. 2 is a detailed representation of a single cell containing a plurality of diffusion stages.

The schematic flow diagram shown in FIG. 1 illustrates the principal pieces of equipment and the arrangement thereof in a typical recovery system for uranium hexafluoride gas, hereinafter referred to as process gas. The example shows the connections needed for a unit 10 containing a plurality of cells, 11, 12, 13, 14, 15, 16, 17, 18, 19 and 20. Each of these cells is connected to an evacuation header 21 and to a header 22 carying air free process gas.

When a cell, such as 13 is to be shut down, process gas is exhausted from it by means of a vacuum pump 23. If the process gas is sufficiently air-free and if a second cell, such as 18, is idle and ready to receive process gas, the latter is filled directly from the pump discharge, through valves 24 and 25. The gas will also pass through a filter 26, which is inserted in the line to remove from the gas any oil originating in the vacuum pump 23.

However, if the process gas from cell 13 is contaminated by air, of if no idle cells are available for receipt of process gas, the contents of the cell 13 are diluted with nitrogen to atmospheric pressure in a manner to be more fully described later in connection with FIG. 2, and exhausted through the vacuum pump 23 and valve 27 to a cold trap 28. Here the process gas is condensed as solid by heat exchange against evaporating refrigerant, such as Freon or liquid nitrous oxide, in the cold trap. Uncondensed air and nitrogen are wasted to the atmosphere through valve 29 and carbon trap 30 which absorbs traces of process gas that may have passed through the cold trap.

When the cold trap has been sufficiently filled with solid uranium hexafluoride, refrigerant is drained from it and electric heat applied. An electric "Calrod" heater (not shown) connected to a source of power through leads 31, 32 may be used for this purpose. If a cell is available for receipt of process gas the contents of the cold trap are vaporized into it by way of valve 33. On the other hand, if no cell is available, the uranium hexafluoride is melted and run as liquid through valve 34 into storage drum 35, from which it may be vaporized at a later time.

The temperature of the trap must be maintained sufficiently low to remove substantially all of the uranium hexafluoride from the mixture of process gas and nitrogen entering the trap. Several considerations govern the choice of a suitable refrigerant. For example, it should be non-toxic, relatively non-reactive with process gas, free of hydrogen, non-explosive and non-inflammable. In addition, it should be suitable for use at evaporator temperatures between −30°F. and −120°F. Satisfactory refrigerants include Freon 12 ($CCl_2F_2$), nitrous oxide ($N_2O$), and carbon dioxide ($CO_2$).

The manner of evacuating and purging a cell containing a plurality of stages may be more clearly understood by reference to a typical cell shown in FIG. 2. In the illustrative embodiment of the invention there disclosed, the cell 40 contains six diffusion stages 41, 42, 43, 44, 45, and 46 together with their associated pumps and heat exchangers. To discharge the contents of such a cell, the following steps may be employed:

1. The cell block is closed by closing valves 47, 48, 49 and 50. All the stage pressure control valves are likewise closed. These valves are shown diagrammatically at 51, 52, 53, 54, 55 and 56. Valve 57, the direct recycle valve is opened. Valves 58 and 59 likewise are opened. Valves 60, 61 and 62 are closed at this point. The cell is now ready for admission of nitrogen.

2. The cell is filled with nitrogen from a nitrogen header 63 by opening vlaves 64, 65, 66, and 67, which have heretofore been closed. Nitrogen passes readily through the diffusion barriers indicated schematically at 68, 69, 70, 71, 72, and 73, and the cell is soon filled with nitrogen. Nitrogen is admitted through valves 64, 65, 66 and 67 in turn and the pressure raised by 0.5 psi increments as shown on a pressure gauge at 74. This flushes the deadened lines and the two recycle lines.

3. Once nitrogen has been admitted in the foregoing manner, valves 58 and 59 are closed, and nitrogen is admitted through valve 65 until atmospheric pressure is reached. The purpose of closing valve 58 at this time is to prevent gas that has leaked through control valve 56 from by-passing the lower numbered stages of the cell. To flush the valve bonnets of valves 58 and 59, these should be alternately opened and closed.

The foregoing procedure series to displace all process gas from the first four stages, which are now filled with nitrogen. Process gas is principally in stages 5 and 6.

4. The cell is now ready for evacuation. Valves 64, 65, 66, and 67 are closed. Control valves 51, 52, 53, 54, 55, and 56 are opened. Valves 60, 61, and 62 are opened thereby connecting the cell with an evacuation header 75, which in turn is connected to a vacuum pump (not illustrated). Nitrogen is then withdrawn from the first four stages and diluted process gas is withdrawn from stages 5 and 6 in the ratio of the volumes of these parts of the cell; that is 2:1. Thus the content of process gas in the gas being evacuated will not exceed 33 percent. The mixture of the process gas and nitrogen removed from the cell is pumped into a cold trap in the manner described with respect to FIG. 1.

5. Once the cell pressure is reduced to 1 mm Hg as indicated on a low pressure gauge 76, valves 59 and 58 are opened and the pressure is again lowered to 1 mm of Hg. Valve 61 is then closed.

6. To further purge the cell, the direct recycle valve 57 is closed. Nitrogen is admitted at valve 67 then at 66. This flushes the inverse recycle line. Nitrogen is then admitted through valve 64. The stage pressure control valves 51, 52, 53, 54, 55, and 56 are closed; valve 57 is opened and nitrogen is admitted at valve 65 until a pressure of 2 or 3 psi is reached. This procedure flushes any process gas remaining in the system toward valve 61 and its associated evacuation line 75.

7. Next, the cell pressure control valves 51, 52, 53, 54, 55, and 56 are opened. The direct recycle valve 57 is opened. Valve 61 is opened and the entire cell is pumped down to approximately 1 mm of Hg as indicated on gauge 76.

8. Finally, valves 60, 61 and 62 are closed and nitrogen is admitted through valves 64, 65, 66, and 67 until atmospheric pressure is reached.

By the foregoing procedure the average partial pressure of process gas in the system is reduced to less than $1 \times 10^{-6}$ atmospheres, although locally, within the cell, it may exceed this value due to incomplete mixing. It is assumed that this is sufficient since any process gas remaining in the cell will be diluted a hundredfold before workmen can come into chronic contact with it. When more direct exposure is anticipated the partial pressure of process gas can be reduced to $1 \times 10^{-8}$ by an additional nitrogen purge.

When the cell is to be again put to use, process gas is admitted by way of header 77 and valves 78 and 79.

By the particular combination of elements disclosed in the foregoing specification and by virtue of the method therein disclosed, it has been found possible to remove substantially all process gas from a cell with considerable savings in the amount of refrigerant needed, in the size of the cold trap and related equipment such as piping, and in the number of purges necessary for removing process gas from the cells. Such savings are realized by so combining the elements of the recovery apparatus that the vacuum pump is intermediate the cell and the cold trap rather than after the cold trap as heretofore has been the practice and in so operating the pump as to charge the gases to the cold trap at approximately atmospheric pressure.

It is to be understood that the foregoing described apparatus is illustrative only and that the scope of this invention is defined in the appended claims.

We claim:

1. A system for recovering a condensible gas by solidifying the same in a cold trap that comprises a vessel to be evacuated, a pump having an inlet and an outlet side and arranged to withdraw gas from said vessel, means connecting said vessel with the intake side of said pump, a refrigerated cold trap for solidifying said gas, said trap having an inlet and an outlet, means connecting the inlet of said cold trap with the outlet side of said pump, an absorbent trap connected with the outlet of said cold trap and arranged to absorb traces of the condensible gas passing through said cold trap, and means for admitting an inert and relatively incondensible gas into said vessel to purge the condensible gas therefrom.

2. A system for recovering a condensible gas by solidifying the same in a cold trap that comprises a vessel to be evacuated, a pump having an inlet and an outlet side and arranged to withdraw gas from said vessel, means connecting said vessel with the intake side of said pump, a refrigerated cold trap for solidifying said gas, said trap having an inlet and an outlet, heating means associated with said cold trap whereby the contents of said trap may be converted to a fluid state, means connecting the inlet of said cold trap with the outlet side of said pump, an absorbent trap connected with the outlet of said cold trap and arranged to absorb traces of said condensible gas passing through said cold trap, and means for admitting an inert and relatively incondensible gas into said vessel to purge the condensible gas therefrom.

3. A system for recovering a condensible gas by solidifying the same in a cold trap that comprises a vessel to be evacuated, a pump having an inlet and an outlet side and arranged to withdraw gas from said vessel, means connecting said vessel with the inlet side of said pump, a refrigerated cold trap for solidifying said gas, said trap having an inlet and an outlet, heating means associated with said cold trap whereby the contents of said trap may be converted to a fluid state, means connecting the inlet of said cold trap with the outlet side of said pump, an absorbent trap connected with the outlet of said cold trap and arranged to absorb traces of said condensible gas passing through said cold trap, means for admitting an inert and relatively incondensible gas into said vessel to purge the condensible gas therefrom, and storage means associated with said cold trap and arranged to receive the contents thereof in liquid form.

4. A system for recovering a condensible gas by solidifying the same in a cold trap that comprises a vessel to be evacuated, a pump having an inlet and an outlet side and arranged to withdraw gas from said vessel, means connecting said vessel with the inlet side of said pump, a refrigerated cold trap for solidifying said gas said trap having an inlet and an outlet, heating means associated with said cold trap whereby the contents of said trap may be converted to a fluid state, means connecting the inlet of said cold trap with the outlet side of said pump, an absorbent trap connected with the outlet of said cold trap and arranged to absorb traces of said condensible gas passing through said cold trap, means for admitting an inert and relatively incondensible gas into said vessel to purge the condensible gas therefrom, and means for returning said gas from said cold trap to said vessel.

5. A system for recovering uranium hexafluoride gas by solidifying the same in a cold trap that comprises a diffusion cell to be evacuated, a vacuum pump having an inlet and an outlet side and arranged to withdraw said gas from said cell, means connecting said cell with the inlet side of said pump, a refrigerated cold trap for solidifying said gas, said trap having an inlet and an outlet, heating means associated with said cold trap whereby the contents of said trap may be converted to a fluid state, means connecting the inlet of said cold trap with the outlet side of said pump, said means including a filter arranged to remove traces of pump oil from the gas being withdrawn from the cell, a fluorocarbon trap connected with the outlet of said cold trap and arranged to absorb traces of uranium hexafluoride gas passing through the cold trap, means for admitting dry nitrogen gas to said cell to purge the uranium hexafluoride gas therefrom, and means for returning the uranium hexafluoride gas to said cell from said cold trap.

* * * * *